(12) United States Patent
Jones

(10) Patent No.: US 12,590,790 B2
(45) Date of Patent: Mar. 31, 2026

(54) MULTIFUNCTIONAL SPEED SQUARE

(71) Applicant: Jeffrey Michael Jones, Sparks, NV (US)

(72) Inventor: Jeffrey Michael Jones, Sparks, NV (US)

( * ) Notice: Subject to any disclaimer, the term of this patent is extended or adjusted under 35 U.S.C. 154(b) by 352 days.

(21) Appl. No.: 18/318,387

(22) Filed: May 16, 2023

(65) Prior Publication Data

US 2023/0288178 A1 Sep. 14, 2023

Related U.S. Application Data

(63) Continuation of application No. 16/873,855, filed on Jul. 27, 2020, now Pat. No. 11,692,803.

(51) Int. Cl.
| | |
|---|---|
| *G01B 3/04* | (2006.01) |
| *G01B 3/56* | (2006.01) |
| *G01B 5/00* | (2006.01) |
| *G01B 11/27* | (2006.01) |
| *G01C 9/26* | (2006.01) |
| *G01C 9/34* | (2006.01) |

(52) U.S. Cl.
CPC .............. *G01B 3/566* (2013.01); *G01B 3/04* (2013.01); *G01B 5/0002* (2013.01); *G01B 11/27* (2013.01); *G01C 9/26* (2013.01); *G01C 9/34* (2013.01)

(58) Field of Classification Search
CPC ........ G01B 3/566; G01B 3/04; G01B 5/0002; G01B 11/27; G01C 9/26; G01C 9/34
See application file for complete search history.

(56) References Cited

U.S. PATENT DOCUMENTS

| | | | | |
|---|---|---|---|---|
| 11,692,803 | B2 * | 7/2023 | Jones ..................... | G01B 3/566 |
| | | | | 33/429 |
| 11,858,291 | B2 * | 1/2024 | Skillicorn ............. | B43L 7/0275 |
| 2016/0271789 | A1 * | 9/2016 | Foster ...................... | G01C 1/00 |
| 2022/0026190 | A1 * | 1/2022 | Jones ....................... | G01C 9/26 |
| 2023/0219362 | A1 * | 7/2023 | Skillicorn ............... | B25H 7/02 |
| | | | | 33/197 |
| 2023/0288178 | A1 * | 9/2023 | Jones ...................... | G01B 3/04 |

* cited by examiner

*Primary Examiner* — Yaritza Guadalupe-Mccall

(57) ABSTRACT

The present invention is a new multipurpose speed square that is easily utilized by any workman who typically requires a means for measuring, aligning, leveling, etc. The speed square is multi-functional, of simple construction, lightweight and portable. The speed square can be easily carried as an all-in-one tool and thus eliminates the need for additional tools, or the like. The speed square that can be manufactured from substantially any suitable material of engineering choice, is cost effective to produce, manufacture, easily marketed and easily sold.

4 Claims, 2 Drawing Sheets

MULTIFUNCTIONAL SPEED SQUARE

FIELD OF THE INVENTION

The present invention relates in general to a speed square commonly utilized by workmen in the construction profession or the like. More particularly the invention pertains to a multifunctional speed square which incorporates additional features therewith so as to eliminate the need for any extra tools and/or other apparatus. The invention is of simple construction, lightweight, portable and easily utilized by any workman.

BACKGROUND OF THE INVENTION

It is well known when constructing a building, an object, or the like that numerous tools are required, each of which are utilized for a different purpose. This can be quite cumbersome and costly for the user. For example, a user may require the use of a leveling means, measuring means, laser alignment means, a speed square, etc. Most of such tools are independent and must be carried and/or transported separately or within a heavy tool box or the like. This presents a problem especially if the workman must carry such tools up and down a ladder, or the like.

Therefore, to resolve this problem the present invention provides a universal multifunctional speed square, which further includes additional tools and/or features therewith, all in one tool. Thus, this eliminates the need for independent, additional tools.

Within the known prior art there have been numerous attempts to provide a speed square that may be utilized for various uses. For example, U.S. Pat. No. 6,688,014 teaches a "BUILDER'S MEASURING AND MARKING TOOL". However, the tool is relatively only functional for its intended use which is for measuring and marking an object. The tool does not include additional features and/or multiple tools in combination as clearly taught by the present invention.

Another example of prior art is taught in U.S. Pat. No. 6,393,710 entitled "COMBINATION TAPE MEASURE AND STRAIGHT EDGE APPARATUS". Wherein the apparatus includes hinges, brackets and moveable parts, all of which the present invention eliminates. The present invention has no moving parts. The prior art apparatus is only functional for its intended use and again does not include multiuse tools and/or additional features in combination. Therefore, the apparatus is very limited in use.

A further prior art reference is exemplified in U.S. Pat. No. 7,481,143 entitled "ALIGNMENT DEVICE". Wherein disclosed is an alignment device including a body having an alignment edge configured to guide a cutting device, an extension portion pivotal relative to the alignment edge, and at least one cutting-line indicator configured to be selectively positioned on the extension portion and configured to indicate a cutting line for the cutting device. In some embodiments, the alignment device may include a plurality of pitch selectors configured to indicate a plurality of different angles, including a first pitch selector indicating a first angle. The body further may include a level indicator configured to identify whether a plank is at first angle when the first pitch selector is selected and the body is positioned in a pitch measurement position on the plank. Although the device is functional for its intended use, again it includes moving parts which the present invention eliminates. It is not of simple construction and does not include multiuse tools and/or additional features in combination.

Yet another prior art reference is exemplified in U.S. Pat. No. 6,839,974 entitled "MULTI-FUNCTION LAYOUT SQUARE WITH LASER". A multi-function layout square of modular construction having a laser that is capable of performing multiple functions is disclosed. The multi-function square has a metallic outer casing with magnetic properties, with a protractor plate slidably, pivotally, and removably attached by thumbscrews to the casing that can be moved and rotated with respect to the casing and slid linearly along a portion of the length of the casing. When the protractor plate is removed the casing may be used as a level, a plumb bob, a ruler, and a compass. This layout square is functional for various uses but is much too complicated, includes numerous moving parts, electrical contacts, a battery, etc. All of which the present invention eliminates. Thus, the present invention has been made simpler without loss of capability.

SUMMARY OF THE INVENTION

The present invention recognizes addresses and resolves the inherent disadvantages associated within the known prior art in a manner heretofore not taught or conceived. The present invention has been made simpler without loss of capability. The present invention is lightweight, portable and user friendly. The invention provides in combination, a speed square having 3-way levels, magnets, laser target card, etc. It is to be noted, nowhere within the known prior art known to the applicant is this combination speed square recognized, suggested or implied.

OBJECTS OF THE INVENTION

It is therefore a primary object of the present invention to provide a new multipurpose speed square that is easily utilized by any workman who typically requires a means for measuring, aligning, leveling, etc. The speed square is, multi-functional, of simple construction, lightweight and portable.

A further object of the present invention is to provide a new multipurpose speed square which can be easily carried as an all-in-one tool and thus eliminates the need for additional tools, or the like.

Yet another object of the present invention is to provide a new multipurpose speed square that can be manufactured from substantially any suitable material of engineering choice.

Still a further object of the present invention is to provide a new multipurpose speed square that is cost effective to produce, manufacture, easily marketed and easily sold.

Other objects and advantages will become apparent when taken into consideration with the following specification and drawings.

DETAILED DESCRIPTION OF THE DRAWINGS

Figure 1:
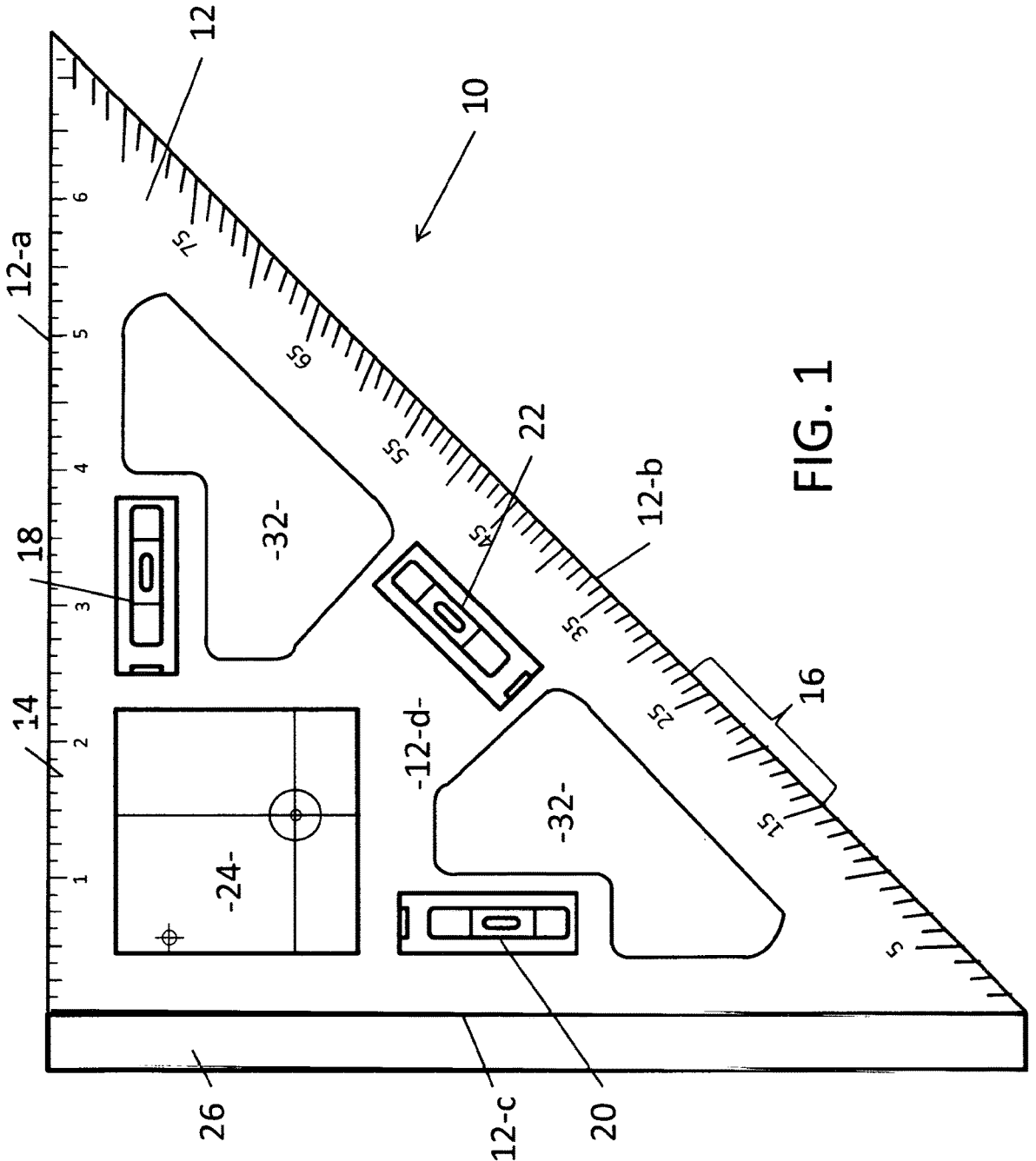
FIG. 1 is substantially a front side view depicting the preferred embodiment for the present invention.
Figure 2:
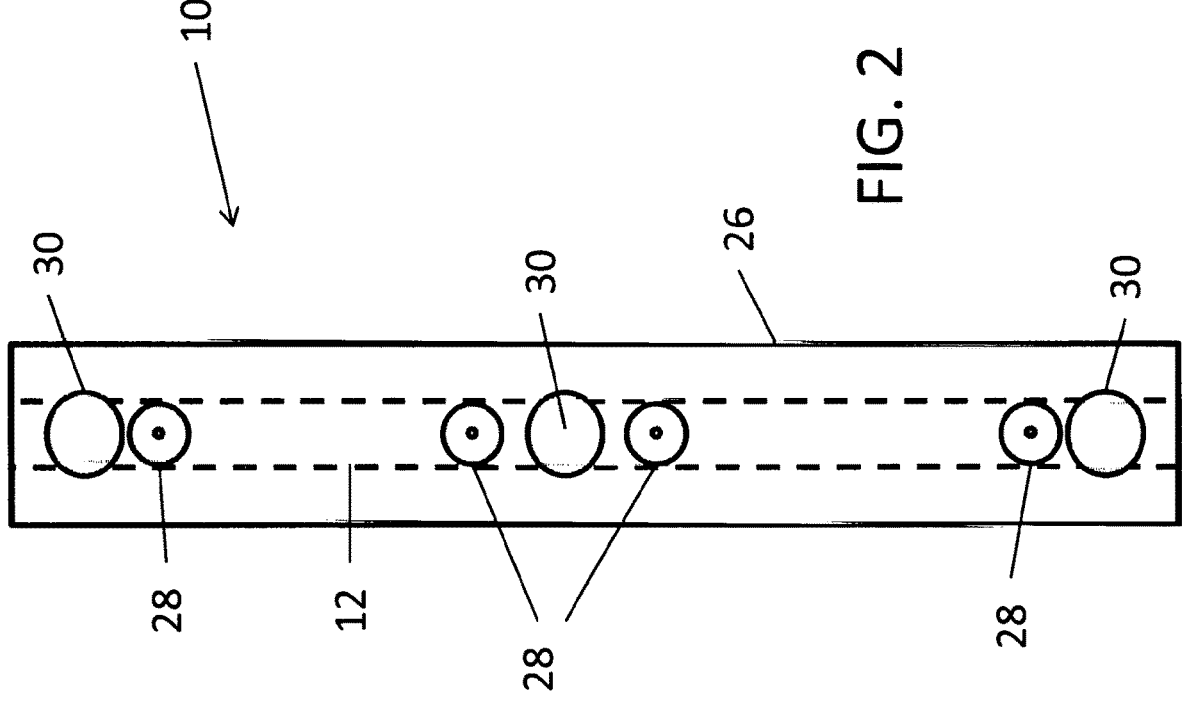
FIG. 2 is substantially a left side end view illustrating an attached flange including attachment means and magnets.

Referring now in detail to the drawings wherein like characters refer to like elements throughout the various views. As illustrated in FIG. 1, (10) represents an overview for the preferred embodiment for the multifunctional speed square of the present invention. It is to be understood the multifunctional speed square (10) can be made of any suitable material of engineering choice. Including but not limited to wood, plastic, metal, acrylic, aluminum, or the like.

The multifunctional speed square (10) is formed in combination from a triangular base member (12) having a first edge (12-*a*), a second edge (12-*b*) a third edge (12-*c*) and a top surface (12-*d*). The top surface (12-*d*) having measuring means (14) thereon, such as a ruler or the like, used for measuring the length of an object, when the object is positioned in a flush manner against the first edge (12-*a*) (object not shown). The top surface (12-*d*) having a plurality of pitch selectors (16) aligned thereon above the second edge (12-*b*) and configured to indicate a plurality of different angles.

The multifunctional speed square (10) further including in combination a first level means (18), a second level means (20), a third level means (22), a fourth level means (24), a flange (26) and magnets (30). The first level means (18) indicates when the first edge (12-*a*) is level in a horizontal aligned position. The second level means (20) indicates when the third edge (12-*c*) is level in a vertical aligned position. The third level means (22) indicates when the second edge (12-*b*) is level in a diagonal angular aligned position. The fourth level means (24) indicates distance from an object (object not shown) and/or horizontal and vertical alignment thereof. The flange (26) is either fixedly or removably attached onto the third edge (12-*c*) by any suitable attachment means of engineering choice. For example but not limited to screws (28) or the like. The magnets (30) are embedded into the flange (26) and are affixed in place by any suitable attachment means of engineering choice, such as glue (not shown). It is to be noted the screws (28) and the magnets (30) have a flush relationship within the flange (26). Also, the flange (26) may be produced in various shapes of engineering choice, such as flat or curved so as to have a mating relationship with diversely shaped objects when the object is positioned against the flange (26).

It is to be further understood each of the level means (18, 20 and 22) cay be of any suitable type, such as standard bubble levels and each may be positioned within a respective cavity and each have a friction fit therein. Still further, the fourth level means (24) may be of any suitable type of engineering choice. For example, the fourth level means (24) may be a typical laser target card plate (24) embedded within the triangular base member (12) and functions with a typical target laser beam (not shown). For example, a standard laser target card plate and a standard target laser beam such as produced and sold by DEWALT™ is most functional. It is to be further noted, the magnets (30) may be of any suitable type which will allow the flange (26) to be magnetically attracted and removably attached onto a metal object, such as a metal rafter, metal beam or the like.

The multifunctional speed square may further include at least one or more cut out section(s) (32) from the triangular base member (12) for reduced weight and is also aesthetically pleasing.

It can now be seen herein presented and taught is a new multipurpose speed square that is easily utilized by any workman who typically requires a means for measuring, aligning, leveling, etc. The speed square is, multi-functional, of simple construction, lightweight and portable. The speed square can be easily carried as an all-in-one tool and thus eliminates the need for additional tools and can be manufactured from substantially any suitable material of engineering choice. Also, the speed square is cost effective to produce, manufacture, easily marketed and easily sold.

Although the invention has been herein shown and described in what is conceived to be the most practical and preferred embodiment, it is recognized that departures may be made there from within the scope and spirit of the invention, which is not to be limited to the details disclosed herein but is to be accorded the full scope of the claims so as to embrace any and all equivalent devices and apparatuses.

The invention claimed is:

1. A multifunctional speed square comprising in combination: a triangular base member having a first base member edge; a second base member edge; a third base member edge; a top surface having measuring means used for measuring a length of an object when said object is positioned in a flush manner against said first base member edge; a laser target card plate embedded within said triangular base member and operable to reflect a laser beam for determining a distance, wherein the laser target card plate comprises a target center point location at a first distance from the first base member edge, a second distance from the second base member edge, and a third distance from the third base member edge, wherein one or more of the first distance or the third distance is greater than one inch, wherein the first distance is less than two inches and the third distance is greater than or equal to two inches.

2. The multifunctional speed square of claim 1, wherein a difference between the first distance and the third distance is less than 1 inch.

3. A multifunctional speed square comprising in combination: a triangular base member having a first base member edge; a second base member edge; a third base member edge; a top surface having measuring means used for measuring a length of an object when said object is positioned in a flush manner against said first base member edge; a laser target card plate embedded within said triangular base member and operable to reflect a laser beam for determining a distance, wherein the laser target card plate comprises a target center point location at a first distance from the first base member edge, a second distance from the second base member edge, and a third distance from the third base member edge, wherein one or more of the first distance or the third distance is greater than one inch, wherein the first distance is less than two inches and the third distance is greater than or equal to two inches, wherein the second distance is greater than or equal to the first distance and the third distance.

4. A multifunctional speed square comprising in combination: a triangular base member having a first base member edge; a second base member edge; a third base member edge; a top surface having measuring means used for measuring a length of an object when said object is positioned in a flush manner against said first base member edge; a laser target card plate embedded within said triangular base member and operable to reflect a laser beam for determining a distance, wherein the laser target card plate comprises,
    a target center point location at a first distance from the first base member edge, a second distance from the second base member edge, and a third distance from the third base member edge,
    wherein the laser target card plate comprises a first laser target card plate edge and a second laser target card plate edge, wherein the laser target card plate is positioned such that the first laser target card plate edge is positioned parallel to the first base member edge, and the second laser target card plate edge is positioned parallel to the third base member edge.

* * * * *